United States Patent Office 3,432,269
Patented Mar. 11, 1969

3,432,269
SPECIFIC FLUOROMETRIC DETECTION METHOD FOR CYANIDE
George G. Guilbault, Harford County, and David N. Kramer, Baltimore County, Md., assignors to the United States of America as represented by the Secretary of the Army
No Drawing. Filed Apr. 7, 1966, Ser. No. 541,022
U.S. Cl. 23—230          9 Claims
Int. Cl. G01n 31/22

This invention relates to an improved detection process and more particularly to a direct process for the specific detection of small quantities of cyanide.

It is well known in the art that numerous procedures are available for the estimation of cyanide. These methods may be classified as follows.

(1) Non-Colorimetric Methods:
 (a) Titrimetric methods involving visual end point detection
 (b) Titrimetric methods involving instrumental end point determination
 (c) Polarographic methods
 (d) Gas Chromatography
(2) Colorimetric Methods:
 (a) Methods involving formation of a metal complex
 (b) Colorimetric methods based on the Konig reaction.

The above cited methods are not truly specific for the cyanide ion. The Konig synthesis (the reaction of cyanogen bromide or chloride with pyridine and an aromatic amine to form a dye) permit the determination of cyanide directly on the original simple and are generally considered the best for small amounts of cyanide. The methods involve the use of complicated procedures of more than three process steps and/or involve the use of carcinogens.

An object of this invention is to provide a simple, direct method for the detection of a small quantity of cyanide.

Another object of this invention is to determine the quantity of cyanide present in the solution after its detection.

Another object of our invention is to develop a one-step method for specifically detecting sub-microgram quantities of cyanide.

Another object of this invention is to add as little as possible, such as 0.5 mg. of the unknown solution to a reagent and solvent wherein a highly green fluorescent product is produced.

The foregoing objects and others are accomplished in accordance with this invention, generally speaking, by applying the method and employing reagent grade chemicals, pure solvents and triply distilled water. All anions tested are added in the form of the chemical pure sodium or potassium salt. A number of quinones and quinone derivatives were investigated to improve the sensitivity namely p-benzoquinone; N-chloro-p-benzoquinone-imine and substituted quinone monoxime benzene sulfonate esters. The order of the rate of reaction and sensitivity increases in the general order: O-(p-nitro benzene sulfonyl) quinone monoxime <N-chloro-p-benzoquinone-imine<p-benzoquinone.

A number of related sulfonate esters were prepared in an attempt to improve the sensitivity of detection and the results obtained are indicated in Table I. In this table, some of the properties of the final green fluorescent product (wavelength of excitation and emission and fluorescence maximum) as well as the rate of reaction as indicated by the rate of production of fluorescence with time, $\Delta F/\Delta t$, and the lowest detectable limit of cyanide (in $\mu$g. per ml. of total solution used) are given.

All fluorescent measurements are made with an Aminco-Bowman Spectrophotofluorometer, (SPF) equipped with a thermoelectric cooler to maintain a constant temperature of 25° C.

The various substituted benzene sulfonate esters of quinone monoxime are prepared by reacting equal molar quantities of the sodium salts of p-nitrosophenol or o-methyl-p-nitrosophenol and p-bromo, p-nitro, p-methoxy or p-methyl benzene sulfonyl chloride in tetrahydrofuran for 15 minutes and adding pyridine with continuous stirring for one hour. The product is then isolated by pouring the reaction mixture into ice water. Filter the precipitate, dry and recrystallize from carbon tetrachloride. Analysis and properties of these compounds may be found in Tables I and II. These substituted benzene sulfonate esters of quinone monoxime can be illustrated by the following formula:

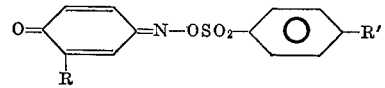

Where R is H, or methyl and R' is a group such as methyl, nitro, methoxy, and bromine, this process is substantially that of Burmistrov et al.

Ukain. Khim. Zhur. 22, 223–8 (1956). See Chemical Abstracts 51: col. 272f.

A series of novel derivatives of the quinone monoxime benzene sulfonate esters are prepared (Tables I and II), in which various substituents are placed on the quinone and aryl sulfonate rings. In general, all the products have approximately the same excitation and emission wavelengths, 400 to 500 mu, respectively. One might also expect, the same total fluorescence, since the same product I is believed produced. Evidently, when an electron withdrawing group is present on the tosylate, a side reaction occurs, namely the alkaline hydrolysis of the tosylate to the quinone monoxime. This compound has been experimentally shown not to react with cyanide to yield the fluorescent product I. Hence, the total fluorescence observed is less when R' is $NO_2$ or Br (Table I).

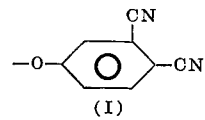

(I)

Substitution on the quinone ring decreased the fluorescence of the product, as well as the rate of reaction. Also, the excitation and emission wavelengths were shifted to shorter wavelengths when R groups in which R is H or lower alkyl are placed on the ring. This is presumedly due to the inhibition of the 1,4 addition of the second cyanide to Compound III in forming Compound IV due to the presence of the R group as disclosed in Ex. 1.

TABLE I.—REACTION OF VARIOUS COMPOUNDS WITH CYANIDE ION

[Substrate=$3.4\times10^{-4}$M in DMSO; $CN^-$=$3\times10^{-5}$M]

| Compound | | $\lambda$ ex.: m$\mu$ | $\lambda$ em.: m$\mu$ | Properties of the Product | | Lowest Detectable Limit of $CN^-$, micrograms/ml. |
|---|---|---|---|---|---|---|
| | | | | $F_{max.}$: units | $\Delta F$/min., F.U./min. | |
| I | O=⟨⟩=O | 400–420 | 480–490 | 90 | 88 | 0.2 |
| II | O=⟨Cl⟩=O | 410–430 | 470 | 40 | 8.0 | 0.2 |
| III | O=⟨⟩=N—Cl | 440 | 500 | 75 | 60 | 1.0 |
| IV | O=⟨⟩=NOSO₂—⟨⟩ | 440 | 500 | 60 | 33.6 | 1.0 |
| V | O=⟨⟩=NOSO₂—⟨⟩—Br | 430–440 | 500 | 50 | 33.5 | 1.0 |
| VI | O=⟨⟩=NOSO₂—⟨⟩—NO₂ | 450 | 500 | 30 | 37.8 | 1.0 |
| VII | O=⟨⟩=NOSO₂—⟨⟩—OCH₃ | 440 | 500 | 60 | 20 | 1.0 |
| VIII | O=⟨⟩=NOSO₂—⟨⟩—CH₃ | 430–440 | 500 | 60 | 22.2 | 1.0 |
| IX | O=⟨CH₃⟩=NOSO₂—⟨⟩—CH₃ | 420 | 490 | 23 | 3.0 | 2.0 |
| X | O=⟨CH₃⟩=NOSO₂—⟨⟩—OCH₃ | 410–420 | 490 | 60 | 10 | 1.0 |

TABLE II.—ANALYTICAL DATA ON VARIOUS COMPOUNDS PREPARED AS SUBSTRATES FOR CN⁻

| Compound: | Melting point, °C. | Carbon | | Hydrogen | | Nitrogen | | Calc. | Other | Found |
|---|---|---|---|---|---|---|---|---|---|---|
| | | Calc. | Found | Calc. | Found | Calc. | Found | | | |
| IV | 130–131 | 54.7 | 54.0 | 3.42 | 3.5 | | | | | |
| V | 151–152 | 42.1 | 42.4 | 2.34 | 2.3 | | | 23.4 | Bromine | 23.6 |
| VI | 164–165 | 46.7 | 46.4 | 2.6 | 2.5 | 9.09 | 9.0 | | | |
| VII | 170–171 | | | | | | | | | |
| VIII | 132 | 56.3 | 56.1 | 4.0 | 3.9 | 5.05 | 5.03 | | | |
| IX | 156–157 | 57.8 | 57.4 | 4.5 | 4.6 | | | 11.0 | Sulfur | 10.9 |
| X | 160–161 | 54.7 | 54.5 | 4.2 | 4.1 | | | | | |

A number of different solvents were tested for use in this reaction. However, only two solvents produced the desired results with the order of fluorescence intensity and rate of reaction increased in the order dimethylformamide (DMF) < dimethylsulfoxide (DMSO).

The effect of solvent on the fluorescence is observed, the total fluorescence increasing with increasing dielectric constant. This effect should be observed, since the fluorescent species is an ionic molecule and solvents favoring the ionic form should be best.

Since the rate and maximum flourescence is obtained in dimethylsulfoxide this solvent is used in all determinations with p-benzoquinone.

Over 30 anions were tested for possible reaction with p-benzoquinone, quinone monoxime benzene sulfonate ester, and N-chloro-p-quinoneimine, to give a fluorescent product. The ions tested were iodide, chloride, bromide, hypochlorite, chlorate, perchlorate, iodate, phthalate, silicate, sulfate, bisulfate, thiocyanate, tartrate, nitrate, fluoride, phosphate, thiosulfate, citrate, bromate, sulfide, periodate, arsenite, sulfite, ferricyanide, cyanate, carbonate, bicarbonate, borate, perborate, bismuthate, tellurite, dichromate, ferrocyanide, sulfide, tungstate, arsenate, molybdate, various nitriles and isocyanates. Only cyanide was found to react with the compounds producing a green fluorescence. Hence, the method is highly specific for cyanide.

The effect of these various anions is tested on the quantitative determination of cyanide. The cyanide used is at a concentration of $3\times10^{-5}$M, the substrates p-benzoquinone and quinone monoxime benzene sulfonate ester have a concentration of $3.4\times10^{-4}$M in dimethysulfoxide. All anions are added at a concentration of 0.1 M, their overall concentration being $3\times10^{-3}$M in aqueous solution. The following ions had no effect at the above added concentration: chlorate, perchlorate, nitrate, iodide, iodate, bromide, bismuthate, sulfate, tartrate, fluoride, chloride, phosphite, citrate, phthalate and thiocyanate. The ions phosphate, bicarbonate, molybdate, cyanate, carbonate, borate, perborate, thiosulfate, bismuthate, tungstate, arsenate, sulfite, silicate, bromate, ferricyanide, dichromate, and sulfide interfer in the determination due to a pH effect. When these compounds are added in pH 7.5 phosphate buffer, no interference is observed in the determination.

The effect of pH of the solution added is given in Table III. If the pH of the added solution (0.1 ml.) is held at 6.5 to 7.5, the reaction will proceed smoothly.

More acidic or basic conditions will tend to slow the reaction. At pH's of 8–10, the solution will turn yellow due to the occurrence of side reactions and no fluorescence is observed.

The cyanide may be added in a water solution (Table III) provided basic interferences are known to be absent (silicate, phophate, etc.). Best results are obtained at pH 7.5 using phosphate buffer and it is recommended that the sample be prepared in this medium if possible. Water has a deleterious effect on the rate of reaction at high amounts (0.3 ml.), the rate decreasing with increasing quantities of this solvent (Table III). For this reason, the sample is added in 0.1 ml. of solution.

The process of our invention provides for a specific fluorometric method for the detection of cyanide. In particular, the technique employed encompasses the addition of the unknown solution to a substrate or reagent such as a quinone monoxime benzene sulfonate ester, N-chloro-p-benzoquinoneimine, or p-benzoquinone with a solvent such as dimethylformamide and dimethylsulfoxide.

The fluorescence produced in the reaction of one of the reagents with cyanide, as well as the initial rate, $\Delta F/\Delta t$, is proportional to the cyanide concentration of the range of concentrations of 0.2 to 50 μg. per ml. of solution. From calibration plots of $\Delta F/\Delta t$ or fluorescence (maximum produced in 3 minutes) vs. cyanide concentration, the amount of cyanide present may be determined with a deviation of about 5%. However, the reagent p-benzoquinone appears to be the most satisfactory substrate for the detection and determination of cyanide, based on sensitivity (Table I), reproducibilty and accessibility.

The invention is further illustrated by the following examples:

Example 1

To 3 ml. of a $3.4\times10^{-4}M$ solution of quinone monoxime benzene sulfonate ester in dimethyl sulfoxide is added 0.1 ml. of the solution to be analyzed, contained in phosphate buffer, pH 6.5–7.5 and containing 0.6 to 150 μg. of cyanide. When a green fluorescence develops, this is an indication that cynide is present. This green fluorescence is read in an Aminco-Bowman Spectrophotofluorometer at excitation and emission wavelengths of 400 to 500 mu, respectively. The amount of cyanide present in the solution may be calculated from calibration plots of fluorescence readings vs. cyanide concentration.

The reaction of Example 1 is shown as follows:

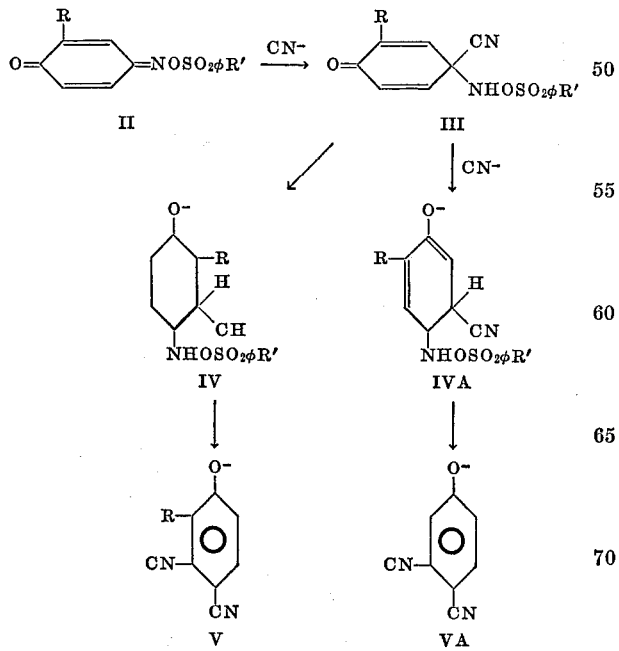

R is H and lower alkl. R' is CH₃, H, OCH₃, and halogen.

TABLE III.—EFFECT OF pH AND WATER ON THE REACTION OF p-BENZOQUINONE WITH CYANIDE ([p-Benzoquinone]=3.4×10⁻⁴M; [CN⁻]=3×10⁻⁵M)

| pH, Buffer | ΔF/min., F.U./min. |
|---|---|
| 6.5, Phosphate | 23 |
| 7.0, Phosphate | 25 |
| 7.0, H₂O | 4.8 |
| 7.5, Phosphate ¹ | 26 |
| 7.5, Tris | 0 |
| 8.0, Tris | 0 |
| 10.0, Tris | 8 |
| 7.5, Phosphate ² | 26 |
| 7.5, Phosphate ³ | 25 |
| 7.5, Phosphate ⁴ | 6.6 |

¹ Total water=0.1 ml.
² Total water=0.2 ml.
³ Total water=0.3 ml.
⁴ Total water=0.5 ml.

Example 2

To 3 ml. of $3.4\times10^{-4}M$ solution of p-benzoquinone in dimethyl sulfoxide is added 0.1 ml. of the solution to be analyzed, contained in phosphate buffer, pH 6.5–7.5 and containing 0.6 to 150 μg. of cyanide. When a green fluorescence develops, this is an indication that cyanide is present. This green fluorescence is read in an Aminco-Bowman Spectrophotofluorometer at excitation and emission wavelengths of 400 to 500 mu, respectively. The amount of cyanide present in the solution may be calculated from calibration plots of fluorescence readings vs. cyanide concentration.

The reaction of Example 2 is shown as follows:

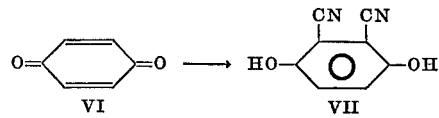

The process of this invention may be employed in the specific detection of cyanide employing various quinone derivatives in conjunction with various solvents. This method is specific for cyanides. It is sensitive—one part per 200 billon of cyanide is detectable. It is fast and an analysis can be performed in two minutes. All the compounds disclosed and employed in this process produce a green fluorescence.

While we have illustrated and described the preferred embodiments of our invention, it is to be understood that we do not limit ourself to the precise limitations herein disclosed and that various changes and modifications may be made within the scope of the invention as defined in the appended claims.

We claim:

1. A specific fluorometric method for the detection of sub-microgram quantities of cyanide which comprises:
 (a) adding an unknown solution contained in a phosphate buffer and having a pH of 6.5 to 7.5 and a concentration up to 0.1 M to a solution of a reagent selected from the group consisting of p-benzoquinone, N-chloro-p-benzoquinoneimine, 2,5-dichloro-4-benzoquinone and a substituted quinone monoxime represented by the formula:

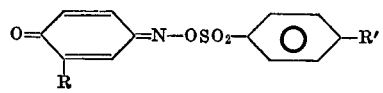

R is selected from the group consisting of H or CH₃, and R' is selected from the group consisting of CH₃, H, NO₂, OCH₃, and bromine and a solvent taken from the group consisting of dimethylformamide and dimethylsulfoxide.

(b) registering the developed green fluorescent solution at excitation and emission wavelengths of 400 to 500 mu, respectively, (c) recording the calibration plots of fluorescence readings versus cyanide concentration whereby the unknown concentration of cyanide may be determined.

2. A specific fluorometric method for the detection of cyanide as defined in claim 1 employing the solvent dimethylsulfoxide and the reagent O-(p-nitro benzene sulfonyl) quinone monoxime.

3. A method as defined in claim 2 employing the solvent dimethylformamide.

4. A method as defined in claim 1 employing the solvent dimethylsulfoxide and the reagent N-chloro-p-benzoquinoneimine.

5. A method as defined in claim 4 employing the solvent dimethylformamide.

6. A method as defined in claim 1 employing the solvent dimethylsulfoxide and the reagent p-benzoquinone.

7. A method as defined in claim 6 employing the solvent dimethylformamide.

8. A method as defined in claim 1 wherein a concentration of $3 \times 10^{-5}$M of the unknown solution is added to a concentration of a $3.4 \times 10^{-4}$M solution of p-benzoquinone in dimethylsulfoxide.

9. A method as defined in claim 8 employing the solvent dimethylformamide.

References Cited

Guibault, G. G. et al. (I): Analytical Chemistery, vol. 37, p. 918 (June 1965).

Guibault, G. G. et al. (II): Analytical Chemistry, vol. 37, pp. 1395–9 (October 1965).

Hanker, J. S. et al.: Analytical Chemistry, vol. 29, pp. 879–81 (June 1957).

MORRIS O. WOLK, *Primary Examiner.*

E. A. KATZ, *Assistant Examiner.*

U.S. Cl. X.R.

252—408